July 24, 1951  F. F. SAND  2,562,127
SPIRIT LEVEL
Filed Oct. 14, 1949
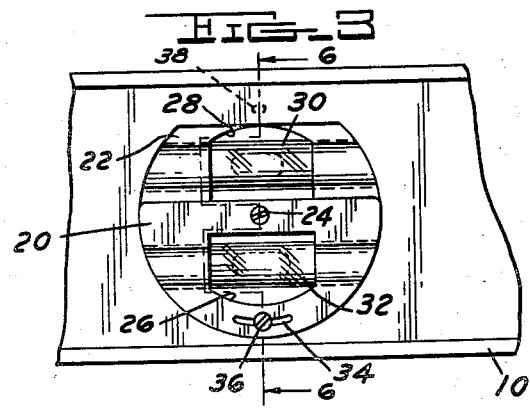
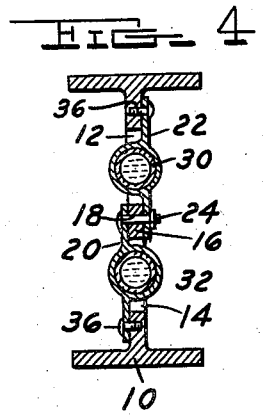
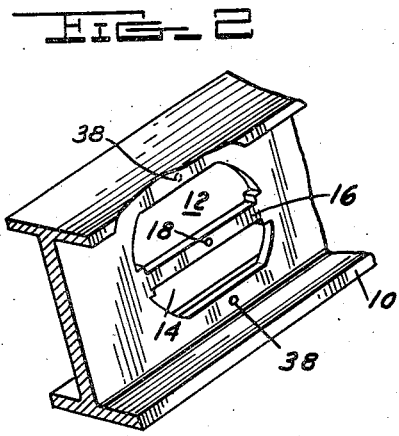
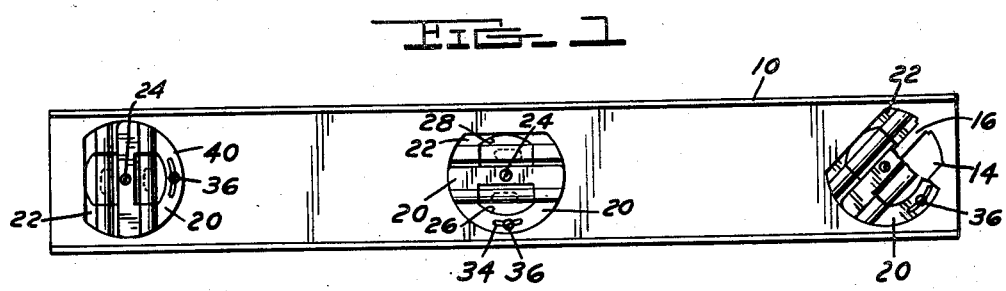
INVENTOR.
FRANK F. SAND
BY
Burton & Parker
ATTORNEYS Patented July 24, 1951

2,562,127

UNITED STATES PATENT OFFICE 2,562,127

SPIRIT LEVEL

Frank F. Sand, Detroit, Mich.

Application October 14, 1949, Serial No. 121,322

2 Claims. (Cl. 33—213)

This invention relates to artisan's levels and particularly to spirit levels with removable bubble tubes.

It has been the practice to mount the bubble tubes or vials permanently within the body of the level. As often happens the tubes are broken and their permanent type of mounting necessitates returning the level to the manufacturer for replacement of the broken tube.

Some improvement was made over this practice by semi-permanently mounting the tubes within the level body and holding them therein by a plurality of screws or other holding means. This method of mounting the tubes within the levels, while facilitating removal thereof, involved a more complicated and expensive structure than embodied within this invention as will be here below seen.

A primary object of this invention is to construct a level having a body adapted to receive a bubble tube holder with a bubble tube removably mounted therein and to fasten secure said holder against the level in a simple inexpensive manner.

A further object is to provide a tube holder that is of simple construction and which may be attached to the level with a minimum of holding elements. Such a holder could be inexpensively sold by retailers in levels to owners of levels who might then replace a broken bubble tube quickly and easily.

Another object of the invention is to provide the level body with circular segmentally shaped transverse side opening apertures separated by a rib portion of the body. The bubble tube holder may be formed of sheet metal or any suitable material and has a viewing aperture therein with a bubble tube mounted on the holder adjacent to said apertures. By fastening the holders adjacent to the apertures in the level body, the bubble tubes are disposed within said apertures and are thereby protected by the rib member and by the body itself.

A further object is to provide adjusting means with each holder, so that upon replacement of the holder the new one may be positioned properly with respect to the edges of the level body.

Another object is to secure two holders to the level body by using a pin common to both holders and one adjustment means in connection with each holder.

Other objects, advantages, and meritorious features of this invention will become more fully apparent from the following drawings, specification, and claims. In the drawings like reference numerals indicate corresponding parts wherein:

Fig. 1 is a side elevation of my level and three holders in varying angular positions with one holder partially broken away;

Fig. 2 is a perspective view of a typical portion of my level body which carries a bubble tube holder;

Fig. 3 is a detail side elevation of a portion of the level body with two tube holders installed; and Fig. 4 is a section along line 6—6 of Fig. 3, showing the disposition of the tube holders relative to the level body.

Referring now to the drawings, reference numeral 10 indicates a level body made of extrusion material in the form of an I beam. The invention does not limit itself to a level body having merely this cross sectional shape but may be used as a level of any cross sectional shape providing it has parallel sides. Transversely of this body are disposed segmental side opening apertures 12 and 14, separated by a rib portion of the body 16. A hole 18 passes transversely centrally through the rib.

Two bubble tube holders 20 and 22 of identical construction and of semi-circular shape are pivoted upon pin 24 interfitting with hole 18 of the rib. The holders are cut away to form apertures therein as at 26 and 28.

Lying partially within, but substantially offset from the plane of said apertures are bubble tubes 30 and 32 permanently mounted upon their respective holders. They are offset from the plane of the aperture or of the holder so that when the holders are positioned upon the level body and adjacent to those apertures therein, as shown in Fig. 4, the bubble tubes will be positioned substantially on the plane of the level body and protected thereby.

A slot 34, equidistantly spaced about the curved edge of the holders, receives a clamping or screw members 36 which threads into the level body at the hole 38. The screw and slot combined form an adjustable clamp or positioning device.

To replace a broken bubble tube in the level, the screw 36 is removed and the bubble tube holder containing the broken tube slide endwise off pin 24. A new tube and holder are replaced upon pin 24. The holder is then pivotally adjusted until the proper respective position is attained, and then screw 36 is replaced and tightened, clamping the holder in the desired position.

Primarily, the screw and slot combination is used merely to make initial adjustments in positioning the holder after replacement thereof, so that the bubble tube will indicate a plane of 000°, 045°, 090°, or the like, with respect to the horizontal, as shown in Fig. 1. Any particular angle of adjustment may be provided for.

What I claim is:

1. A spirit level comprising a level body I-shaped in cross section and having opposed parallel longitudinal edge portions connected by a web portion, said web portion cut away providing a pair of complementary segment-shaped apertures spaced apart by a portion of the web in the shape of a rib extending between said apertures parallel to and substantially midway between the opposite longitudinal edge portions of the body, a pair of complementary bubble tube holders, one for each aperture, each holder comprising a tubular portion and a flange portion, said flange portion projecting laterally from its tubular portion and extending generally parallel to the axis of the tube and adjacent to one linear edge thereof, said tube holders disposed on opposite sides of the rib with the flanges of the holders overlapping opposite sides of a portion of the web and secured thereto supporting the tubular portions of the two holders within the segment shaped apertures upon opposite sides of the rib substantially equidistant therefrom and substantially within the plane of the web, a bubble tube mounted within the tubular portion of each holder, the tubular portions of the two holders cut away providing viewing openings arranged in opposition to each other facing the rib.

2. A spirit level comprising a level body I-shaped in cross section and having opposed parallel longitudinal edge portions connected by a web portion, said web portion cut away providing a pair of complementary segment-shaped apertures spaced apart by a portion of the web in the shape of a rib extending between said apertures parallel to and substantially midway between the opposite longitudinal edge portions of the body, a pair of complementary bubble tube holders, one for each aperture, each holder comprising a tubular portion and a pair of opposed flanges projecting laterally away from said tubular portion in proximity to one linear margin thereof and substantially parallel to the axis of the tube, said holder disposed on opposite sides of the rib with the tubular portions of the two holders arranged within the segment-shaped apertures upon opposite sides of the rib substantially within the plane thereof, the two flanges of one holder overlapping one side of the web including the rib and the two flanges of the other holder overlapping the opposite side of the web including the rib, means securing the flanges of the two holders which overlap the rib pivotally thereof upon a common pivot for swingable movement of each holder within its segment-shaped aperture, the other flange of each holder which overlaps the web provided with an arcuate slot and securing means extending through said slot into the web adapted to secure the holder at adjusted positions of swing, a bubble tube mounted within the tubular portion of each holder, the tubular portions of the two holders cut away providing viewing openings disposed in opposition to each other and facing the rib.

FRANK F. SAND.

REFERENCES CITED

The following references are of record in the file of this patent:

UNITED STATES PATENTS

| Number | Name | Date |
|---|---|---|
| 573,682 | Morton | Dec. 22, 1896 |
| 646,098 | Nilson | Mar. 27, 1900 |
| 756,949 | Ferguson | Apr. 12, 1904 |
| 895,311 | Stettler | Aug. 4, 1908 |
| 1,212,735 | Bodner | Jan. 16, 1917 |
| 1,298,844 | Wichertjes | Apr. 1, 1919 |
| 1,435,365 | Zieman | Nov. 14, 1922 |
| 1,456,431 | Frank | May 22, 1923 |
| 1,792,266 | Atkinson | Feb. 10, 1931 |
| 2,453,091 | Holloway | Nov. 2, 1948 |